United States Patent Office 3,285,871
Patented Nov. 15, 1966

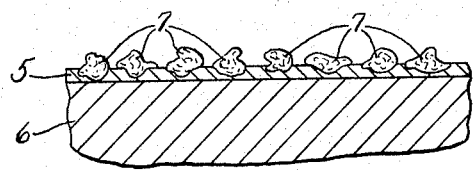

3,285,871
DISPERSIONS OF RUBBER AND A POLYHYDRIC ALCOHOL, WITH AND WITHOUT BITUMEN, AND THE PRODUCTION THEREOF
Harold V. Carlson, Hudson, Ohio, assignor to The Firestone Tire & Rubber Company, Akron, Ohio, a corporation of Ohio
Filed Mar. 23, 1961, Ser. No. 97,877
7 Claims. (Cl. 260—28.5)

This invention relates to dispersions of rubber and polyhydric alcohol, dispersions of rubber, bitumen and polyhydric alcohol, and the production of such dispersions.

Blends of rubber and bitumen have been used in paving for years. Although it has been known that there are advantages in using the rubber in the form of latex, there have been various drawbacks, perhaps the chief of which has been the fact that only a small amount of water in the bitumen, even as little as a fraction of a percent, causes the bitumen to boil and foam when heated above the boiling point of water.

According to this invention, the water of the latex is replaced by a polyhydric alcohol, and this dispersion or latex is mixed with the bitumen. The dispersion or latex may be formed by evaporating the water of the latex under a vacuum and replacing it with the alcohol, or when the rubber is a synthetic polymer, such a dispersion of the polymer in the alcohol may be produced directly by carrying the polymerization out in the alcohol instead of in water. For certain latexes, it is necessary to increase the quantity of stabilizer over that required for an aqueous latex, in order to prevent coagulation during processing.

The alcohol does not dissolve the rubber, but it disperses in the oils and other constituents of the bitumen, and the rubber is at least partially soluble in the resulting dispersion or latex.

The rubbers that can be used preferably have a Mooney value (ML/4/212° F.) of 50 or more. The rubber may be a natural rubber, a chloroprene, an isobutylene-isoprene copolymer (butyl rubber), a butadiene-acrylonitrile copolymer, a homopolymer of a conjugated diene or copolymer of conjugated dienes, or any reclaimed rubber, but is preferably a copolymer of (1) a conjugated diene, such as butadiene, isoprene, 2,3-dimethylbutadiene, piperylene, 2-chlorobutadiene, 2,3-dichlorobutadiene, 2-fluorobutadiene or the like, and (2) a vinyl aromatic compound such as styrene, vinyl toluene, vinyl naphthalene, a nuclearly substituted styrene such as a halostyrene, alkyl styrene or the like. These rubbers dissolve to some extent in a bitumen and alcohol dispersion. An elastomeric copolymer of butadiene and styrene is preferred.

The bitumen as used here may be asphalt or tar, and includes native and artificial bitumens, such as residues from the distillation of petroleum, coal tars and the like, and other bituminous paving materials such as gas house tars, coke oven tars, water gas tars, pitches, road oils, pyrogenous bitumens, cut-back bitumens, and the like. The bitumen preferably has a penetration at 77° F. of at least 40 and the penetration may be as much as 300 or more. (Penetration test: A.S.T.M. D–5.)

For a composition suitable for pavings and surface treatment of roadways, the latex is used in such an amount that there is about 1 to 15 percent (dry weight) of the rubber to 99 to 85 percent of the bitumen. Generally 50 to 100 percent of the polyhydric alcohol will be used, based on the weight of the rubber. In the following description all percentages are percentages by weight.

The alcohol may be any polyhydric alcohol with a boiling point greater than water, as, for example, glycerine or a glycol. A polyethylene glycol is preferably used, although a polypropylene glycol, etc. can be used. The composition of the latex may vary from about 20 to 80 percent (by weight) of rubber and 80 to 20 percent of the alcohol. Generally the amount of alcohol is minimized, because it acts as a plasticizer, although as much as 80 percent glycerine can be used where great fluidity is desired in the product. If there is more than 80 percent of rubber in the blend, the dispersion is pasty and hard to handle.

The dispersion of the rubber in the alcohol is made by heating an aqueous latex or dispersion to a temperature of, for example, 200 to 300° F. under a vacuum of 20 to 27 inches, and adding the alcohol before heating, or gradually during heating, or adding some at both stages. Any stabilizer required to maintain the rubber molecules suspended in the alcohol, may be added to the aqueous latex or the alcohol, or to the alcohol latex.

As illustrative, the following examples is cited: An elastomeric polymer of butadiene and styrene (ratio of 75:25) in aqueous latex of 60 percent solids content is heated to 240° F. under a vacuum of 22 inches of mercury while sufficient glycerine is added to produce a dispersion of 55 percent rubber content. The vacuum is maintained until substantially all of the water has been removed from the latex. The resulting product is blended with petroleum-residue asphalt having a penetration of 85–100 (Penetration method: A.S.T.M. D–5) with stirring in the tank of a bituminous pressure distributor or other asphalt tank to produce a blend of 94.6 percent asphalt, 3 percent rubber and 2.4 percent glycerine which is essentially free from water. As the mixing continues, the rubber dissolves in oils from the asphalt and swells, with a blending of the asphalt and rubber at the interfaces between the rubber particles and the asphalt. The glycerine content which is small is dispersed throughout the asphalt and serves to plasticize the blend.

The bitumen-rubber blends are usually applied hot. It is possible to prepare such a blend from aqueous latex or a powdered rubber material, but this is slow and requires expensive equipment. Consequently, blends prepared from aqueous rubber latex or powdered rubber materials must be made at a plant and shipped hot to the place of use. This may necessitate storage in a tank car for several days enroute. If the weather is inclement when the tank car is received for unloading near the place of use, the blend is stored hot until the weather clears. Such prolonged storage causes deterioration of desirable properties of the blend.

There has been wide use of bitumen alone, but it becomes brittle in the cold, and softens at summer heat. Blending with rubber makes a product having improved physical properties under all weather conditions. The alcohol plasticizes the blend, but the amount present is very small. The lower boiling ethylene glycols tend to vaporize at the temperature at which some bitumens are heated for delivery and application, so glycerine is generally preferred. A mixture of glycerine and a glycol can be used.

The blend is used for the paving, surface treatment or sealing of highways, airfields and the like, or as an adhesive or sealant for industrial applications. Aggregate may be mixed with the blend, the type and amount of aggregate being varied to meet the requirements of a certain type of application. The blend may be poured or sprayed over the aggregate or mixed with it. Usually the surface to be treated is covered with the blend, and the aggregate (stone or the like) is sprinkled into this while the blend is still hot. Ordinarily the aggregate will be no more than one layer deep for each application, and the depth of the blend will be about one-third the average height of the stones.

The invention is further illustrated in the drawing, which shows a side elevation of a treated surface.

The drawing shows a layer of the rubber-asphalt-alcohol blend 5, on the asphalt or concrete roadway or the like 6, with pieces of stone 7 scattered on it. The stone is added while the blend is still tacky and fluid, and the blend forms a firm bond with the stone.

Illustrative of the invention is a blend of 3 percent by weight of rubber from GR–S 2105 latex (elastomeric copolymer of butadiene and styrene), 2.4 percent of glycerine which is essentially free from water, and 94.6 percent of asphalt residue from petroleum distillation. A photograph magnified 300 times, for example, will show as lighter areas, the rubber which has dissolved oil from the asphalt. As the rubber particles swell they tend to coalesce. Rubber materials which are particularly desirable are those which are partially soluble in the asphalt. Asphalt will appear as blacker areas. In the final product there is a continuous phase of the asphalt, and the rubber tends to form a continuous phase. The rubber does not dissolve into the alcohol, but the alcohol is in the final blend.

The blend is advantageously prepared at the site where it is to be used. If desired, the blend may be prepared at some other location and delivered to the site where it is to be used.

The invention is covered in the claims which follow. What I claim is:

1. A dispersion blend of 85 to 99 parts of bitumen with a penetration of 40 to 300, 15 to 1 parts of a rubber, and a polyhydric alcohol with a boiling point greater than water which is present in an amount equal to 20 to 80 parts by weight per 80 to 20 parts of the rubber present.

2. In the method of making a rubber-bitumen blend by heating 85 to 99 parts by weight of bitumen with a penetration of 40 to 300, 15 to 1 parts of a rubber, and polyhydric alcohol with a boiling point over that of water in an amount equal to 20 to 80 parts of alcohol for each 80 to 20 parts of rubber present; the improvement in which the rubber is supplied as a dispersion of 20 to 80 parts by weight of rubber in 80 to 20 parts of the alcohol.

3. The method of producing a rubber dispersion of 20 to 80 parts by weight of a rubber in 80 to 20 parts by weight of a polyhydric alcohol with a boiling point greater than that of water, which comprises adding the alcohol to a rubber latex and under heat and a vacuum volatilizing the water therefrom.

4. A dispersion of 20 to 80 parts by weight of a rubber in 80 to 20 parts of a polyhydric alcohol with a boiling point greater than that of water.

5. A dispersion of 20 to 80 parts by weight of rubber copolymer of butadiene and styrene, in 80 to 20 parts of glycerine.

6. A dispersion blend of 85 to 99 parts by weight of bitumen with a penetration of at least 40, correspondingly 15 to 1 parts by weight of a rubber, and a polyhydric alcohol with a boiling point greater than water, said polyhydric alcohol being present in an amount of from 20 to 80 parts by weight per correspondingly 80 to 20 parts by weight of said rubber.

7. The method of producing a dispersion which comprises adding glycerine to a latex of elastomeric polymer of butadiene and styrene, and heating under a vacuum to remove substantially all of the water, the amount of glycerine added being sufficient to produce a dispersion of substantially 3 parts of the polymer to 2.4 parts of glycerine; and then blending substantially 5.4 parts of the dispersion with 94.6 parts of asphalt with a penetration of 85 to 100.

References Cited by the Examiner
UNITED STATES PATENTS

| | | | |
|---|---|---|---|
| 1,793,265 | 2/1931 | Twiss et al. | 260—33.4 |
| 2,797,203 | 6/1957 | Barber et al. | 260—29.7 |
| 2,807,596 | 9/1957 | Flickinger | 260—28.5 |
| 2,880,127 | 3/1959 | Spokes | 260—28.5 |
| 2,892,592 | 6/1959 | Greene et al. | 260—28.5 |
| 2,978,351 | 4/1961 | Pullar | 260—28.5 |
| 2,996,467 | 8/1961 | Hawley et al. | 260—28.5 |

OTHER REFERENCES

Rose: The Condensed Chemical Dictionary, Reinhold Publishing Corp., New York, page 527, 1956.

MORRIS LIEBMAN, *Primary Examiner.*

MILTON STERMAN, *Examiner.*

J. ZIEGLER, D. C. KOLASCH, *Assistant Examiners.*